May 1, 1956 J. J. HOEHN 2,743,647

TELEVISION MOTION PICTURE PROJECTOR MECHANISM

Filed April 27, 1953 2 Sheets-Sheet 1

INVENTOR.
John J. Hoehn
BY Morris A. Rabkin
ATTORNEY

May 1, 1956 J. J. HOEHN 2,743,647

TELEVISION MOTION PICTURE PROJECTOR MECHANISM

Filed April 27, 1953 2 Sheets-Sheet 2

INVENTOR.
John J. Hoehn
BY Morris A. Rabkin
ATTORNEY

United States Patent Office 2,743,647

Patented May 1, 1956

2,743,647

TELEVISION MOTION PICTURE PROJECTOR MECHANISM

John J. Hoehn, Pennsauken Township, Camden County, N. J., assignor to Radio Corporation of America, a corporation of Delaware Application April 27, 1953, Serial No. 351,273

10 Claims. (Cl. 88—18.4)

This invention relates to film projectors for television transmission, and particularly to the pull-down or intermittent film advancing mechanism used in such projectors when associated with a television storage type transmission system.

It is well-known, as described in an article by Ralph V. Little, Jr., in the Journal of the Society of Motion Picture Engineers for February, 1947, volume 48, that television scanning occurs at thirty frames per second and motion picture projection occurs at twenty-four frames per second. Thus, in order to correlate the two scanning rates and to properly present the images to the storage pickup tube, a two to three rate of film pull-down is required such as disclosed in Bedford U. S. Patent No. 2,082,093. This two to three ratio is obtained in the present invention by rotating a cam at a speed of 720 R. P. M., the cam pulling the film down twice per revolution, once in 144 degrees, and once in 216 degrees.

Since the image on the pickup tube is scanned during the dark periods, the pull-down period may be made sufficiently long between vertical blanking times to permit the mechanism to be operated at a comparatively low speed. This provides a long service life for the mechanism with a minimum of wear. It also permits an economical type of intermittent pull-down mechanism to be provided, which can be made sturdy to advance the film with maximum accuracy. No great accelerations need be provided, such as are necessary with the "flying spot" type of scanning, wherein the pull-down time must be within the vertical scanning time, which is in the neighborhood of 1.336 milliseconds.

The principal object of the invention, therefore, is to facilitate the advancement of motion picture film in a two to three ratio.

Another object of the invention is to provide a motion picture film pull-down mechanism which is economical to manufacture, sturdy in construction, and has a long service life with the minimum of wear.

A further object of the invention is to provide an improved pull-down mechanism providing a two to three ratio with the minimum of acceleration for the film.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 6:
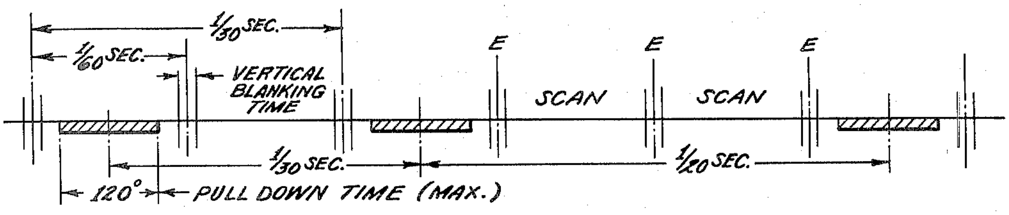
Fig. 6 is a diagram showing the relationship of pull-down times of the film with respect to vertical blanking times of the television system.

Referring now to Fig. 6, the diagram shows the vertical blanking times as being between the two solid lines spaced one-sixtieth of a second apart. Since two scanning times constitute a television field, the next time element is shown as existing between two vertical blanking times, which is one-thirtieth of a second. In the storage type of film transmission by television, the face of the Iconoscope is impressed with an image only during the vertical blanking times, and the film is then scanned while the image is removed from the tube by a shutter. This shutter operates at 3600 revolutions per minute and has a small opening therein to expose the film to the Iconoscope during these short blanking periods. Thus, a film may be advanced one frame between any two vertical blanking periods, but in a relationship such that for each five scanning periods, the film is pulled down twice. In this manner, one motion picture frame will be scanned twice, and the next frame will be scanned three times. This correlates the television scanning time of thirty frames per second with a motion picture scanning time twenty-four frames per second. As shown in Fig. 6, the pull-down time is shown by the cross-hatched sections, the time between two of the pull-down periods being one-thirtieth of a second, and the time between the next pull-down period being one-twentieth of a second. By a time relationship shown in Fig. 6 by the cross-hatching, the film may be advanced at a rate which will not overstress the mechanism and will permit it to have a long service life with maximum accuracy.

Referring now to the other figures showing the intermittent mechanism and in which the same reference numerals identify like elements, a casting or housing 5 has four bearings therein, bearings 6 and 7 supporting a shaft 8 on which is a drive gear 10 and a pinion gear 14. Since the mechanism operates in oil, a seal constituting a casing 11 and a spring 12 is employed. The pinion gear 14 is in mesh with a cam gear 15.

Mounted on one side of cam gear 15, is a grooved cam 17 consisting of an outer section 16 and an inner section 18 to provide the serpentine groove 43. On the opposite side of cam gear 15 is a cam plate 21 having raised sections 53 and 54 and fastened to the gear by screws 19 which are in arcuate elongated slots 20 for adjustment of the cam plate 21. The gear 15, cam 17, and cam plate 21 are mounted on a shaft 23 rotatable on bearings 24 and 25 in the housing 5. The housing 5 is partially filled with oil, which is controlled by the reservoir 26.

The claw element of the invention consists of a flat steel spring body section 28 with a combination reinforcing and guide plate 29 through both of which is mounted a cam follower pin 30. One end of the body 28 has a terminal member 32 fastened thereto, the member 32 being mounted in the upper end of a coil spring 33. The other end of the spring 33 is fitted around the upper reduced end 34 of a hollow screw 35, which is threaded in the casing 5 and held thereon by a nut 36. A resilient bumper 37 is mounted in the hollow of the screw 35. The other end of the spring body 28 has mounted thereon a claw element 39 having three teeth 40, the claw 39 being attached by rivets 41. This entire claw element is purposely made light and only weighs in the neighborhood of six and one-half grams, which reduces the wear on the follower pin 30 as the claw unit is driven vertically to pull down the film. The spring 33 maintains the pin 30 in contact with the edge of inner section 18 at all times to insure against backlash in the claw cycle. To further insure against backlash, the bumper 37 is so dimensioned and positioned that the terminal member 32 will contact it during the last part of the down stroke (approximately three percent to five percent of the total down motion) of the body section 28.

Figures 1, 2, 3:
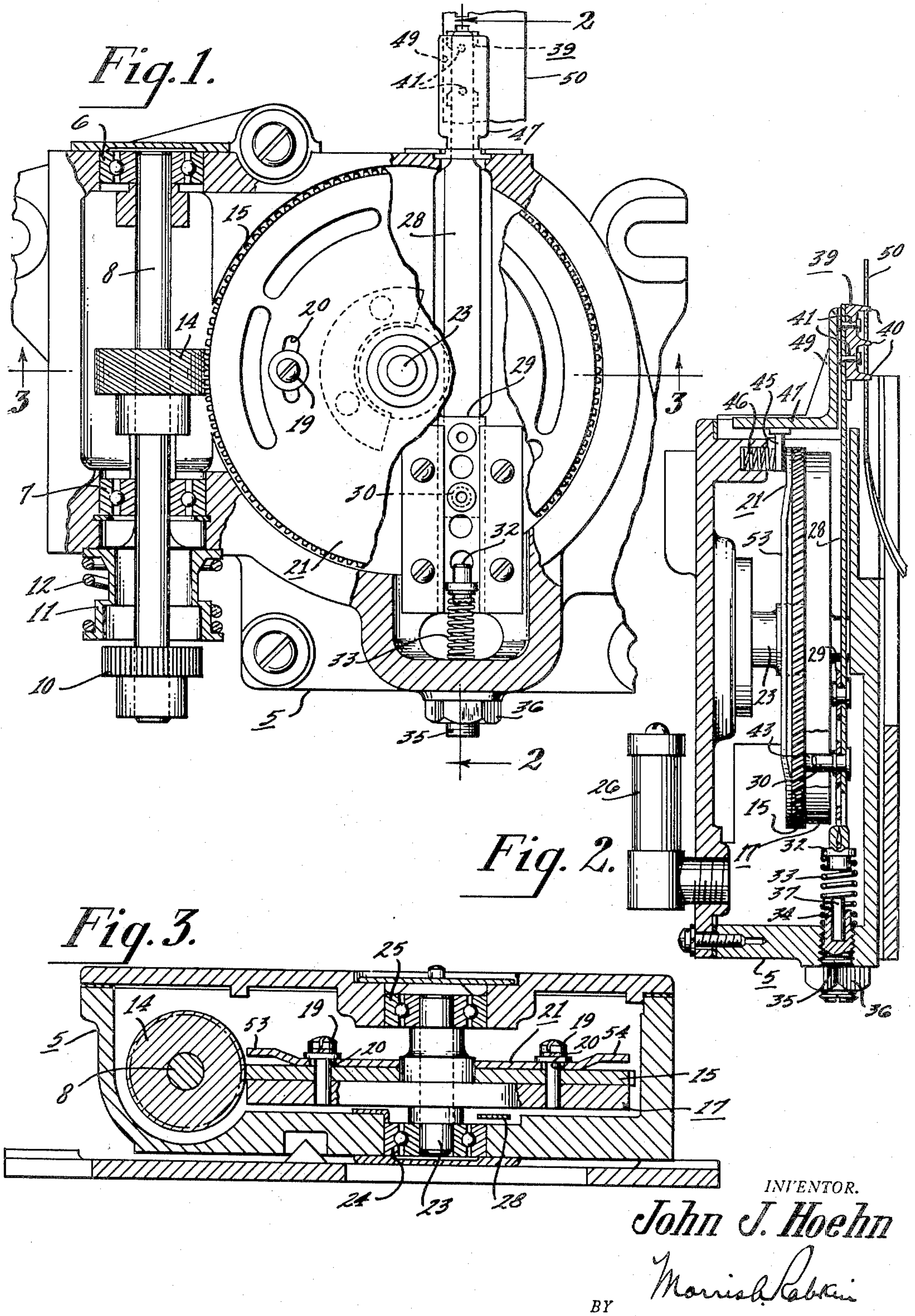
Fig. 1 is a front, elevational view, partly in cross-section, of a pull-down mechanism embodying the invention.
Fig. 2 is a cross-sectional view of the mechanism shown in Fig. 1, taken along the line 2—2 of Fig. 1.
Fig. 3 is a cross-sectional view of the mechanism of Fig. 1 taken along the line 3—3 of Fig. 1.

The in-and-out motion of the claw 39 is provided by the cam plate 21 moving a follower pin 45 against the tension of a coil spring 46. The pin 45 is attached to a bracket 47 having a grooved guide block 49 in which the claw moves vertically. Thus, the cam 21 will move the bracket 47 to the left by raised sections 53 and 54 (see Fig. 2), which removes the teeth 40 from the film 50, while the spring 46 will cause the teeth to enter the film perforations when relieved by the cam plate, the two cams 17 and 21 providing a rectangular pull-down cycle for the claw 39.

Figures 4, 5:
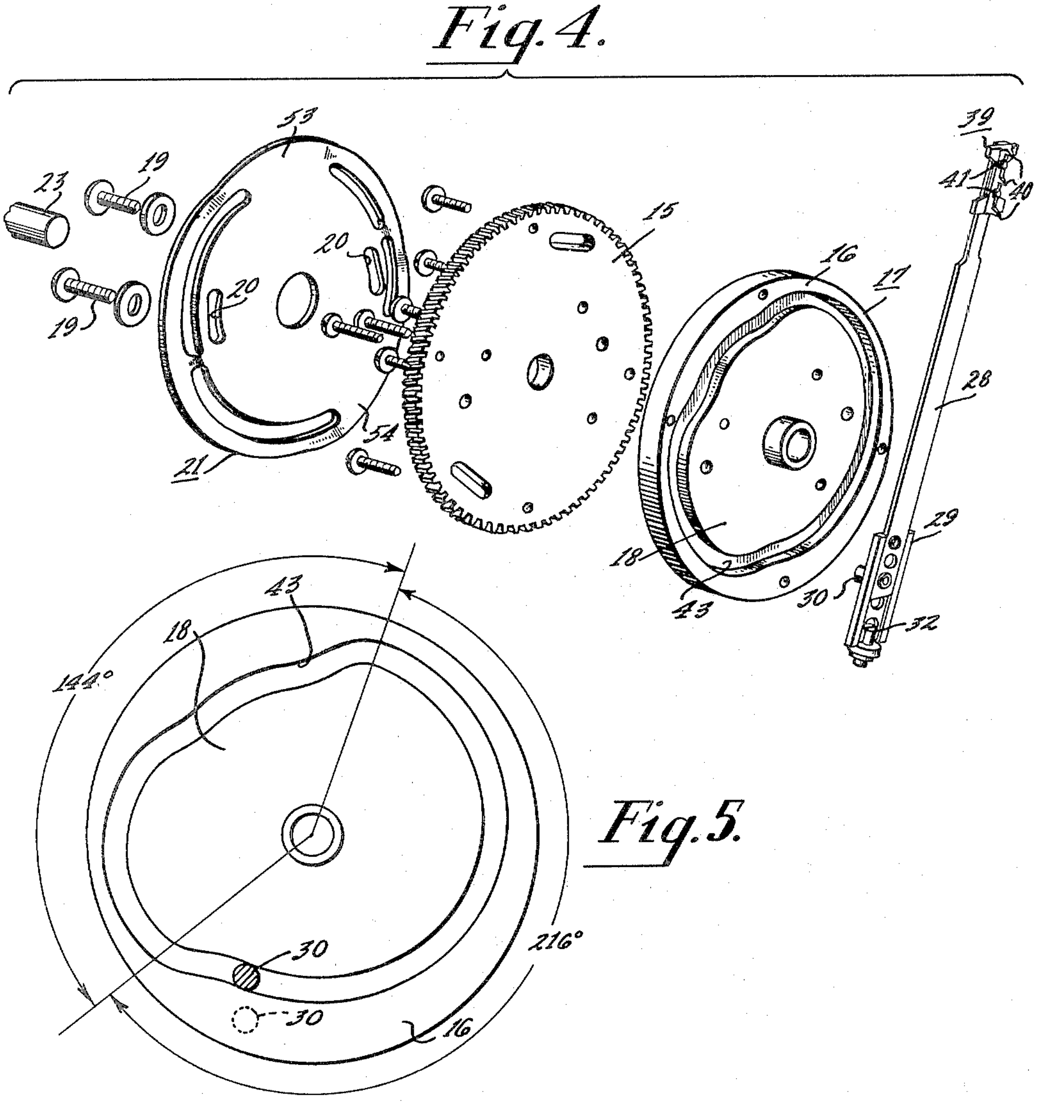
Fig. 4 is an exploded view of the cam and claw elements of the pull-down mechanism.
Fig. 5 is a plan view of the pull-down cam used in the invention.

As mentioned above, two pull-down cycles are provided for each rotation of the gear 15, and consequently, of the cam 17 and cam plate 21. As shown in Fig. 5, the two pull-down periods are spaced 144 degrees and 216 degrees apart, so that one-thirtieth of a second exists between two of the pull-down periods and one-twentieth of a second exists between the subsequent pull-down periods. This provides the relationship shown in Fig. 6, whereby the film is pulled down twenty-four frames per second, while each frame is scanned at a rate of thirty fields per second. It will be noted that the gear and cam elements are simple and sufficiently sturdy to move the light claw assembly with maximum accuracy. The mechanism is capable of operating over long periods without attention.

I claim:

1. A film pull-down mechanism comprising a casing, a pinion gear within said casing, a cam gear in mesh with said pinion gear, a cam attached to one side of said gear, said cam having a groove therein, a cam plate mounted on the other side of said gear, a follower positioned in the groove of said cam, a follower abutting said cam plate, a claw unit attached to said first mentioned follower for producing rectilinear motion thereof in one direction, and means interconnecting said claw unit and said second mentioned follower for producing rectilinear motion of said claw unit at right angles to the first mentioned motion of said claw unit, said groove having two radially decreasing portions and two radially increasing portions for moving said claw unit twice in the same direction during one revolution of said cam gear.

2. A film pull-down mechanism in accordance with claim 1, in which said claw unit includes a flat, elongated spring body portion, said first mentioned follower being mounted adjacent one end thereof and a claw mounted at the other end thereof, and a spring adjacent one end of said body portion for urging said claw unit in one direction.

3. A film pull-down mechanism in accordance with claim 1, in which is provided a bracket attached to said second mentioned follower urged in one direction by said cam plate, a spring for urging said second mentioned follower in the opposite direction, and a grooved unit for guiding said claw therein during its movement of said first mentioned follower.

4. A film pull-down mechanism in accordance with claim 1, in which said cam plate has two raised portions to move said claw unit twice in the same direction during one revolution of said gear, the radially decreasing portions of said groove and said raised portions of said cam plate being unequally spaced circumferentially of said cam gear to provide unequal periods between the movements of said claw unit in said same direction.

5. An intermittent film advancing mechanism comprising a flat, circular gear, a pinion meshed with said gear for continuously rotating said gear, a two-section flat disc on one side of said gear, said sections being separated by a serpentine groove of constant width and attached to said gear for rotation therewith, a plate on the other side of said gear, said plate having a pair of rim sections further removed from said gear than the remaining section thereof, a pin follower in said groove, a second pin follower abutting said rim sections of said plate, a film moving claw unit in a plane parallel with planes of the faces of said gear disc and plate, means for attaching said first mentioned pin follower to said unit adjacent one end thereof, and means for attaching said second pin follower to the other end of said unit, said groove having two radially decreasing portions and two radially increasing portions for moving said claw unit twice in the same direction during one revolution of said gear.

6. An intermittent film advancing mechanism in accordance with claim 5, in which said claw unit has an elongated, flat spring body portion, a claw at one end of said body portion and a resilient element at the other end of said body portion urging said unit in one direction of its movement controlled by said first pin follower.

7. An intermittent film advancing mechanism in accordance with claim 6, in which said means for attaching said second pin follower to said claw unit is a bracket having a grooved guide member, said claw being longitudinally movable therein as said claw is moved perpendicularly to said movement by said bracket.

8. An intermittent film advancing mechanism in accordance with claim 7, in which the radially decreasing portions of said groove and the rim sections of said plate are unequally spaced circumferentially of said gear to provide unequal periods between the movements of said claw unit in said same direction.

9. An intermittent film advancing mechanism for obtaining unequal periods between the advancement of the frames of a film comprising a flat circular gear, means for driving said gear at a constant speed, means attached to one side of said gear and having a serpentine groove therein, means attached to the other side of said gear and having a pair of circumferentially positioned sections farther removed from said gear than the other sections thereof, a follower oscillated in one direction by said groove, a follower oscillated in another direction by said rim sections, and a film moving claw unit attached to said followers, said groove having a pair of radially decreasing sections and a pair of radially increasing sections, said radially decreasing sections being unequally spaced circumferentially of said gear, and said rim sections being unequally spaced circumferentially of said gear to provide said claw unit with two movements in the same direction during one rotation of said gear, said movements being unequally spaced.

10. An intermittent film advancing mechanism in accordance with claim 9 in which said claw unit has an elonated flat spring body portion, and a resilient element at the other end of said body portion urging said unit in one direction of its movement under control of said first mentioned follower.

References Cited in the file of this patent

UNITED STATES PATENTS

| | | |
|---|---|---|
| 2,200,342 | Reardon | May 14, 1940 |
| 2,338,680 | Zuber | Jan. 4, 1944 |
| 2,409,834 | Clapp | Oct. 22, 1946 |
| 2,434,359 | Giroux | Jan. 13, 1948 |
| 2,484,348 | Kellogg | Oct. 11, 1949 |
| 2,489,829 | Stechbart | Nov. 29, 1949 |

FOREIGN PATENTS

| | | |
|---|---|---|
| 721,400 | Germany | June 4, 1942 |